United States Patent [19]

Derain

[11] 4,073,396

[45] Feb. 14, 1978

[54] MOVABLE CONTAINER ADJUSTABLE IN HEIGHT, FOR LOADING ON A VEHICLE

[75] Inventor: Christian Derain, Saint-Aubin-Le Vieil Evreux Eure, France

[73] Assignee: Societe Nouvelle des Bennes Saphem, La Neuve-Lyre, France

[21] Appl. No.: 789,314

[22] Filed: Apr. 20, 1977

[30] Foreign Application Priority Data

Apr. 21, 1976 France .................................. 76 11760

[51] Int. Cl.² .............................................. B60P 1/54
[52] U.S. Cl. ..................................... 214/515; 52/125; 52/194; 214/77 R
[58] Field of Search ................: 214/77 R, 501, 515; 52/122, 125, 194

[56] References Cited

U.S. PATENT DOCUMENTS

| 2,606,676 | 8/1952 | Dempster | 214/515 |
| 3,874,537 | 4/1975 | Kou | 214/515 X |

*Primary Examiner*—Robert G. Sheridan
*Attorney, Agent, or Firm*—Karl W. Flocks

[57] ABSTRACT

In a vehicle having a chassis and intended for the transportation and spreading of materials, a combination comprises a chassis extension, a loading and unloading device mounted on the chassis by means of the chassis extension. It includes a hoist having at least one vertical branch with an upper end provided with a hook and a horizontal arm pivotably mounted around a pivoting axle parallel to the ground and transverse to the chassis so as to be able to pivot the hoist under the effect of a jack. A movable container is adjustable in height and includes a cradle provided at the front and at the rear with vertical posts in engaging relationship with sliders each having at least one hooking member to cooperate with said hook. The sliders are connected to a bridge including at least one longitudinal beam and a receptacle supported by the bridge. Means for inclining the bridge are provided to connect the latter to the sliders and to permit it to take up an inclined position depending on the position of the sliders. Immobilizing means are provided to immobilize the sliders with respect to the vertical posts in a desired position.

10 Claims, 6 Drawing Figures

MOVABLE CONTAINER ADJUSTABLE IN HEIGHT, FOR LOADING ON A VEHICLE

BACKGROUND OF THE INVENTION

1. Field of the Invention

The present invention relates to a movable container of adjustable height, for loading on a vehicle, notably for the distribution of fertilizers or solid powdered substances as well as any other solid materials such as sand, gravel, cereals, seeds, to be loaded on a vehicle, unloaded on the ground and adjusted in height, by means of a device mounted on the vehicle and constituted essentially of a pivoting hoist comprising at least one vertical branch provided with a hook cooperating with a hooking member for said container and a horizontal branch constituting a support and tipping control arm for said container.

2. Description of the Prior Art

Such a device may, for example, be similar to that described by Applicant in his French Pat. No. 2,109,109. This device comprises essentially an angle member or hoist retractable in length and tiltable, acting as a support and as a control arm for a container through a hooking member arranged at the upper part of the vertical branch of said hoist. This device enables a container to be placed on the ground from a vehicle and conversely and, in addition, enables the whole to function as a tilting skip or bucket.

Now, in applying the possibilities for tipping the hoist, Applicant has now found that it was possible to transport, to place on the ground and to take up again from the ground, a container arranged on the frame, constituting a distribution station for a material directly on site, as well as to raise and lower the receptacle of said container relative to the ground, at will.

In the field of fertilizer spreading notably, it is advantageous for the user to be able to place a distributing station in the vicinity of the treated area, at which it is possible to supply its spreading means so as to limit its travel. However at the present time, movable stations involve complicated equipment for the operations of transportation, positioning and taking up again. Moreover, these stations, generally mounted on feet, further complicate the above operations due to the fact of their unequal and unforeseeable penetration into the ground, for example, a terrain for agricultural exploitation.

It is an object of the present invention to overcome these drawbacks by providing a movable container, combined with a device such as mentioned above, enabling the supplying on location of any spreading means, easy to place in operation and to replace, and resting very firmly on the ground.

SUMMARY OF THE INVENTION

The container according to the invention, combined with a loading and unloading device mounted on the chassis of a vehicle by means of a chassis extension, of the type comprising a hoist having at least one vertical branch and one horizontal branch and whose vertical branch comprises a hook at its upper end and whose horizontal branch can pivot under the action of a jack around a pivoting axis parallel to the ground and transversal to said chassis, is characterized by the fact that it comprises a cradle provided at the front and at the rear with vertical posts, sliders in engaging relationship with said posts and connected to a bridge comprising at least one longitudinal beam supporting a container, and means for changing the inclination of the bridge, said sliders being provided with at least one hooking member cooperating with said hook, and the vertical posts having holes to receive slider immobilizing pins.

According to other advantageous characteristics of the invention, the means for changing the inclination of the bridge comprise for example, at the rear of the cradle, an articulation of the longitudinal beams with respect to the sliders around a first transverse axis, and at the front, a slide port formed in the beams and an articulation of the beams with respect to the sliders around a second transverse axis, or even connecting rods pivoted close to their ends respectively to the sliders and to the bridge, an articulation with respect to the sliders around a first transverse axis, and an articulation with respect to the bridge around the second transverse axis, either directly to the container or to the beam, or through a part of the bridge itself fast to the container or to the beam.

Other characteristics and advantages of the present invention will emerge better from the description which follows, given with respect to the accompanying drawings.

DESCRIPTION OF THE PREFERRED EMBODIMENTS

Figure 1:
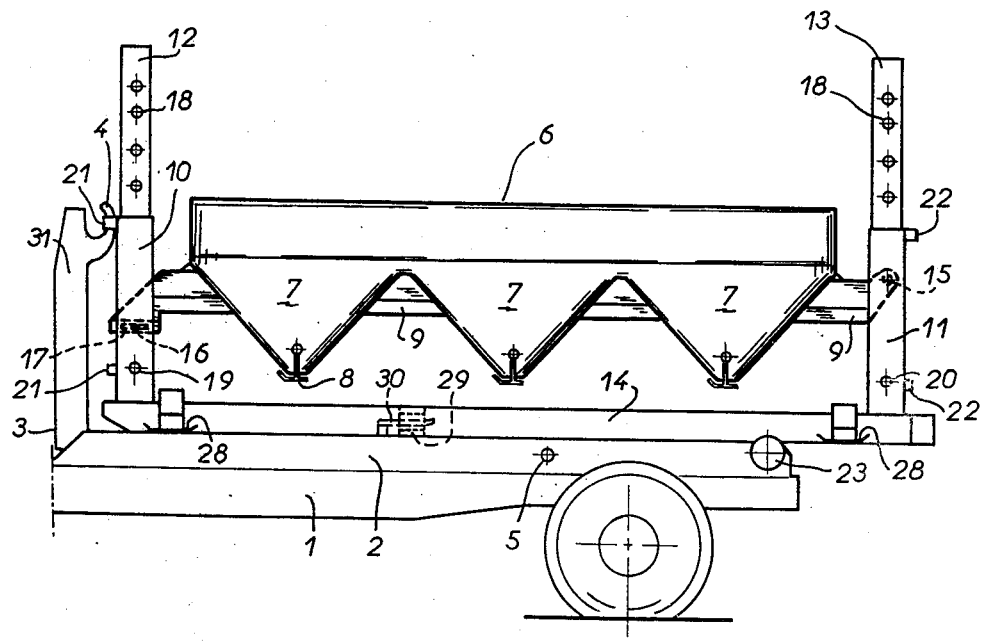
FIG. 1 is a side view showing several of the principal members of a preferred embodiment of a compartmentalized container according to the invention, in transportation position on a vehicle.

A container according to the invention is in loading position on the chassis 1 of a vehicle comprising, on a chassis extension 2, a loading and unloading device of the type mentioned above provided with a hoist 3 comprising at least one vertical branch 31 and one horizontal branch 32 and whose vertical branch 31 comprises a hook 4 at its upper end. The horizontal branch 32 of said hoist 3 can pivot around an axle 5 parallel to the ground and transversal to the chassis extension 2. The container proper is constituted by a receptacle 6, for receiving products, and can comprise several closed compartments 7 with an inclined bottom of a type known in itself, terminated by a trap door 8. The receptacle 6 is supported here by two longitudinal beams 9 with which it forms a bridge adjustable in height and which are arranged in the longitudinal direction of the vehicle. The beams 9 are connected at each of their ends to two front 10 and rear 11 sliders, themselves in engaging relationship with vertical front 12 and rear 13 posts, and here engaged around these vertical front 12 and rear 13 posts, fixed by their lower part to a cradle 14. The rear end of the beams 9 is connected to the slide 11 through a pivot with a transverse axis 15, itself borne by a crossmember connecting the two rear posts 13 and, in order that the receptacle 6 can, during its raising or its lowering, take up a position inclined with respect to the horizontal so that it can be actuated first on one side and then on the other by the loading and unloading device, the front end of the beams 9 is connected to the slide 10 by means of a transverse axle 16 engaged in a slide hole 17 arranged at said front end of the beams 9, this assembly thus constituting means for changing the inclination of the bridge and more particularly of the receptacle. The posts 12 and 13 are provided with holes 18 which can receive front 19 and rear 20 spindles for locking the height of the slides 10 and 11, respectively, and borne by the latter. The posts 12 and 13 carry the same number of holes, which occur in pairs on the same horizontal plane.

The hook 4 cooperates with a hooking member 21 disposed at the upper part of the slide 10, a second hooking member 22 being similarly positioned at the upper part of the slide 11. The purpose of this second member 22 will be explained below.

The bottom of the cradle 14 is supported on rollers 23 arranged at the rear part of the chassis extension 2.

Figure 2:
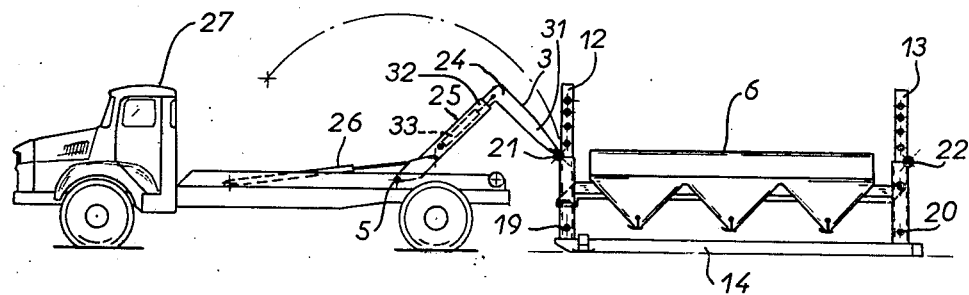
FIGS. 2 to 5 show diagramatically on a reduced scale, the sequence of operations of putting into action on the ground the preferred embodiment of FIG. 1.
Figure 3:
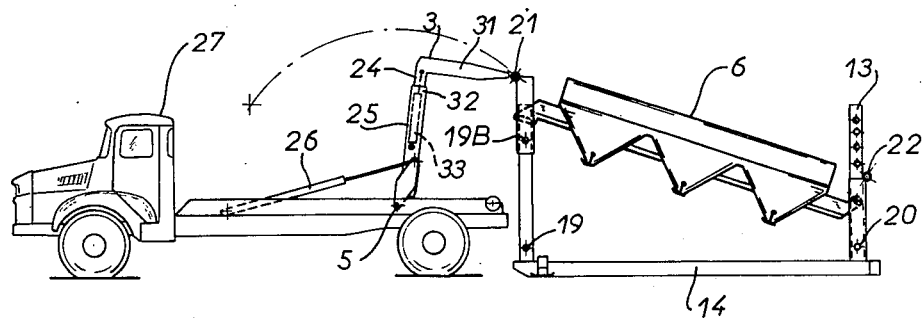
Figure 4:
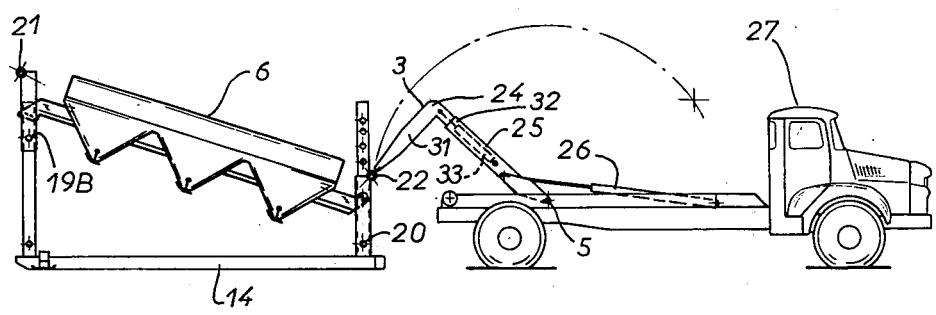

Referring to FIGS. 1 to 5, the placing of the container in operation takes place as follows:

Starting from the position shown in FIG. 1, the container 6 being in lower position with respect to the posts 12–13, a pivoting movement of the hoist 3 rearwards around the axis 5 by means of a jack 26, results in the container being deposited on the ground (see FIG. 2).

The container being on the ground, the hook 4 then being engaged in the hooking member 21, the front pin 19 is withdrawn and the hoist 3 is then made to tilt forwards, which has the effect of moving the front slide 10 towards the upper part of the post 12, the difference in path, which is curvilinear, of the hook 4 and of the linear slide 10 causing a slight movement of the vehicle 27, which compensates for said difference. The longitudinal beam 9 follows the movement of the slide 10 and is tilted due, on the one hand, to the slide hole 16 and, on the other hand, to the axle hinge 15. At the end of this movement, the spindle 19 is replaced in a hole of suitable level, at 19B (see FIG. 3). The hook 4 is then disengaged, and the rear of the vehicle is then presented facing the rear part of the container, by engaging the hook 4 in the hooking member 22 of the slide 11 (see FIG. 4).

Figure 5:
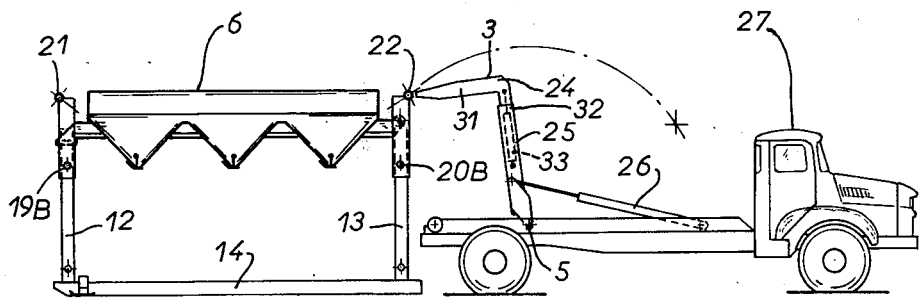

Due to the same manoeuvre of raising the slide 11 as previously, the spindle 20 is engaged at 20B, so that the receptacle is in horizontal position (see FIG. 5). The hook 4 can then be disengaged, and the vehicle can be released.

The reverse manipulations are carried out for taking up the container again from the ground and loading it on the vehicle.

Advantageously, the hoist 3 of the loading and unloading device can include a lower or "horizontal" branch 32, constituted by a sliding portion 24 engaged in the slideway 25 itself articulated on the axle 5. If necessary, a control jack 33 enables the sliding portion 24 to be more or less engaged in the slideway 25 prior to actuation of the tilting jack 26, which enables notably, by further engaging the sliding portion 24 in the slideway 25, the unlocking of the container with respect to the horizontal branch 32 due to feet 29 placed under the bottom of the cradle, engaged in transportation position on stubs borne by the slideway or the rear part of the chassis extension (FIG. 1).

The sliding of the slides on the posts, which has been described above as being operated directly under the action of the movement of the hoist 3, that is to say with the same course as that of the elevation of the latter, can be carried out in any other suitable manner, for example by means of a compass with two arms or by link-rods, in order to increase the travel of the slides with respect to the elevation of the hoist 3.

It should also be noted that the slides 10, 11 may be provided with a hooking member 21, 22 arranged either at their upper part, or at their lower part, or even indeed with two hooking members 21, 22, one at the upper part, the other at the lower part (FIG. 1). The hooking member 21, 22 at the lower part notably enables an increase in elevation to be obtained during taking up from the ground.

In addition, the cradle 14 may be provided with soles 28 for improving, if necessary, its seating on the ground.

Figure 6:
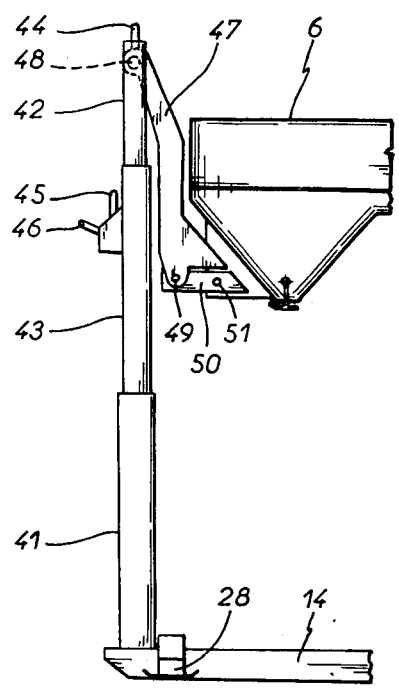
FIG. 6 shows diagramatically in upper position, a partial view of a modification of the embodiment of a compartmentalized container according to the invention, whose putting into action on the ground differs somewhat from that of the embodiment of FIG. 1.

The embodiment of FIG. 6 shows a movable container where the relationship of engagement between posts and slides is obtained in a slightly different manner, although equivalent, with telescopic devices in three parts. The outermost parts of the telescopic devices are here fixed to the cradle 14, and hence constitute posts 41, corresponding to the posts 12, 13 of FIG. 1. The innermost parts support the receptacle 6 and hence constitute the slides 42 corresponding to the slides 10, 11 of FIG. 1. Intermediate parts or slides 43 enable the desired extension for the telescopic devices. The parts 41, 42, 43 may also be locked into position with respect to one another by means of hole and spindle devices, not shown. The slide 42 comprises a hooking member 44 in the form of a ring for the hook 4 of the vertical arm 31 of the hoist 3 of the loading and unloading device, and the intermediate part or slide 43 comprises two hooking members 45, 46 with a hook 4, also in ring form, whose respective functions will be explained in the remainder of the description (alternatively, one of the two hooking members, for example the lower hooking member 46, may be borne by the post 41).

Although it is possible to provide longitudinal beams provided with slide holes, suitably connected to the slides 42, the figure shows another possibility of changing the tilting of the receptacle 6 and more generally of the whole of the bridge. This is constituted by a link-rod device 47 articulated in proximity to one end around a transverse axle 48 to the slide 42, and articulated close to their other end around a transverse axle 49. This articulation may be effected either directly, or indirectly through a foot 50 and a fixing member 51, to the receptacle 6 to one beam or to another part fast to the receptacle 6, the whole constituting the bridge adjustable in height between the slides. It will be easily understood that the receptacle 6 can be thus, according to the position of the posts 41 and of the slides 42, 43, inclined with respect to the horizontal between the posts and the front and rear slides, due to a changing position of the link-rods 47. In practice, it is advantageous to construct the adjustable container symmetrically at the front and at the rear, also the posts and the front and rear slides are identical as well as the intermediate parts, and this is the same for the means for changing the inclination of the bridge.

For placing in operation on the ground the container of FIG. 6, the latter being in low position, the hook 4 is introduced into the lower hooking member 46 of the intermediate part 43 or of the post 41, and the unloading manoeuvre is carried out in the usual manner. The container being on the ground, the lateral soles 28 being folded back and pinned, the hook 4 is disengaged from the hooking member 46 and engaged in the hooking member 44 of the slide 42, then the slide 42 is raised by its hooking member 44, by means of rotation of the hoist 3 accompanied by retreat of the vehicle 27. When the slide 42 is at the end of its travel, it is immobilized by means of the spindles, for example, such as described for the first embodiment. The hook 4 is then disengaged from the hooking member 44 by manipulating the hoist 3 rearwards, and engaged in the hooking member 45 of the intermediate part 43. The pins of the intermediate part 43 are disengaged and the hoist 3 is manoeuvred by pivoting towards the front of the vehicle 27, in order to again raise the receptacle 6. When the branch (normally) horizontal 32 or the hoist 3 is vertical, the jack 33 is actuated so that the sliding part 24 is raised until the receptacle 6 has reached the desired height, the immobilizing spindles of the intermediate part 43 are then replaced in position to maintain the desired height, the hoist 3 is retracted, and the vehicle is advanced. To place the receptacle 6 in horizontal position, it suffices to operate in the same way on the other side. To lower the receptacle again, the manipulations are executed in reverse order, first taking the hooking member 45 of the intermediate part 43, after having elongated the normally horizontal branch of the hoist 3 by about 30 centimeters in order to disengage the hook 4 from the hooking member.

It is to be noted that the symmetry of the container enables it to be transported and to be manoeuvred equally from the front or from the rear. Moreover, the particular concept of the invention permits its operation in simple, rapid and effortless manner by one person.

It is of course to be understood that the present invention has only been described and shown by way of preferred example and any technical equivalent can be introduced therein without departing from its scope.

I claim:

1. In a vehicle having a chassis and intended for the transportation and distribution of materials, a combination comprising:

a chassis extension, a loading and unloading device mounted on said chassis by means of said chassis extension, and comprising a hoist and a jack, the hoist having at least one vertical branch and one horizontal branch, the vertical branch having an upper end provided with a hook, and the horizontal branch being mounted pivotably around a pivoting axle parallel to the ground and transverse to said chassis so as to be able to cause the hoist to pivot under the effect of said jack; and a movable container adjustable in height comprising a cradle provided at the front and at the rear with vertical posts, sliders in engaging relationship with said posts and each having at least one hooking member to cooperate with said hook of the upper end of the vertical branch of said hoist, immobilizing means for temporarily immobilizing in a desired position said sliders with respect to said vertical posts, a bridge comprising at least one longitudinal beam and a receptacle supported by said beam, and means for inclining said bridge, connecting the latter, in proximity to its ends, to the sliders, and enabling the latter to take up an inclined position depending on the relative position of the sliders.

2. In a vehicle as claimed in claim 1, a movable container in which the sliders are engaged around the vertical posts.

3. In a vehicle as claimed in claim 1, a movable container in which the sliders are engaged in the vertical posts, intermediate sliders being inserted between said sliders and said posts to form a telescopic device.

4. In a vehicle as claimed in claim 1, a movable container in which the means for changing the inclination of the bridge include at the rear of the cradle an articulation of the beams with respect to the sliders around a first transverse axle, and at the front a slide hole formed in the beams with an articulation of the beams with respect to the sliders around a second transverse axle.

5. In a vehicle as claimed in claim 2, a movable container in which the means for changing the inclination of the bridge include at the front and at the rear of the cradle link-rods articulated in proximity to their ends respectively to the sliders and to the bridge, with an articulation with respect to the sliders around the first transverse axle, an articulation with respect to the bridge around a second transverse axle.

6. In a vehicle as claimed in claim 1, a loading and unloading device having on the one hand a hoist of which said horizontal branch comprises a sliding portion and a slideway, said sliding portion being engaged in the slideway, said slideway being mounted pivotably around said pivoting axle parallel to the ground and transverse to said chassis, and on the other hand control means for the relative position of said sliding portion and of said slideway of the horizontal branch of said hoist, such as a jack, of which the two parts movable with respect to one another are made fast respectively to said sliding portion and to said slideway of the horizontal branch to actuate said sliding portion in a longitudinal translation movement with respect to the slideway.

7. In a vehicle as claimed in claim 6, a movable container provided with a cradle of which the bottom includes feet, and a loading and unloading device provided with a slideway including stubs, said feet and said stubs cooperating to lock said cradle in transportation and to unlock it for tilting in further engaging said sliding portion of the horizontal branch of said hoist in said slideway.

8. In a vehicle as claimed in claim 1, a movable container adjustable in height in which the immobilizing means for temporarily immobilizing in a desired position said sliders with respect to said vertical posts comprise pins for immobilizing the sliders, said vertical posts including holes to receive said immobilizing pins, said holes being distributed in the front and rear posts in horizontal planes.

9. In a vehicle as claimed in claim 1, a movable container in which said receptacle includes distinct compartments for the transportation and spreading of pulverulent solid materials.

10. In a vehicle as claimed in claim 1, a movable container in which said hooking members of said sliders are provided in proximity to the ends of said sliders.

* * * * *